(12) United States Patent
Nakajima et al.

(10) Patent No.: US 12,422,039 B2
(45) Date of Patent: Sep. 23, 2025

(54) VEHICLE DRIVE DEVICE

(71) Applicant: AISIN CORPORATION, Kariya (JP)

(72) Inventors: Kazunori Nakajima, Kariya (JP); Wataru Washino, Kariya (JP); Hideki Ishikawa, Kariya (JP); Nozomu Takahashi, Kariya (JP); Takayoshi Hanai, Kariya (JP); Hiroaki Sanji, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/695,438

(22) PCT Filed: Sep. 27, 2022

(86) PCT No.: PCT/JP2022/035952
§ 371 (c)(1),
(2) Date: Mar. 26, 2024

(87) PCT Pub. No.: WO2023/054363
PCT Pub. Date: Apr. 6, 2023

(65) Prior Publication Data
US 2024/0392877 A1     Nov. 28, 2024

(30) Foreign Application Priority Data

Sep. 28, 2021   (JP) ................................ 2021-158217

(51) Int. Cl.
*F16H 57/04*     (2010.01)
*B60K 1/04*      (2019.01)
(Continued)

(52) U.S. Cl.
CPC ....... *F16H 57/045* (2013.01); *F16H 57/0457* (2013.01); *F16H 57/0483* (2013.01);
(Continued)

(58) Field of Classification Search
CPC .. F16H 63/34; F16H 63/3416; F16H 63/3425; F16H 63/3433; F16H 63/3466;
(Continued)

(56) References Cited

U.S. PATENT DOCUMENTS

| | | | |
|---|---|---|---|
| 2013/0134010 A1* | 5/2013 | Kimura | B60T 1/005 192/219.5 |
| 2022/0049768 A1* | 2/2022 | Nakamatsu | H02K 9/19 |
| 2023/0313886 A1* | 10/2023 | Matsuo | F16H 63/3466 192/219.5 |

FOREIGN PATENT DOCUMENTS

| | | |
|---|---|---|
| DE | 10 2021 208 654 A1 | 2/2022 |
| EP | 2 570 311 A1 | 3/2013 |

(Continued)

OTHER PUBLICATIONS

Dec. 13, 2022 International Search Report issued in International Patent Application No. PCT/JP2022/035952.
(Continued)

*Primary Examiner* — Richard M Lorence
(74) *Attorney, Agent, or Firm* — Oliff PLC

(57) ABSTRACT

A parking assembly includes a parking gear in a rotary member included in the first power transmission that transmits power between a rotary electric machine and wheels and movable with the wheels, an engagement member selectively engageable with the parking gear, and a second power transmission that transmits power to the engagement member. The parking gear is coaxial with the rotary electric machine. A reservoir and the second power transmission are located above the first power transmission. An area of the reservoir in a front-rear direction, an area of the first power transmission in the front-rear direction, and an area of the second power transmission in the front-rear direction overlap an area of the rotary electric machine in the front-rear direction.

10 Claims, 4 Drawing Sheets

(51) Int. Cl.
*F16H 57/02* (2012.01)
*F16H 63/34* (2006.01)

(52) U.S. Cl.
CPC ..... *F16H 57/0495* (2013.01); *F16H 63/3425* (2013.01); *F16H 63/3466* (2013.01); *B60K 2001/0405* (2013.01); *F16H 2057/02034* (2013.01)

(58) Field of Classification Search
CPC ......... F16H 57/045; F16H 2057/02034; F16H 57/0457; F16H 57/0483; F16H 57/0495; B60T 1/005; B60T 1/062; H02K 7/006; H02K 7/10; H02K 7/116; B60K 1/00; B60K 2001/0405
See application file for complete search history.

(56) References Cited

FOREIGN PATENT DOCUMENTS

| | | |
|---|---|---|
| JP | 2009-280178 A | 12/2009 |
| JP | 2020-106096 A | 7/2020 |
| WO | 2011/141947 A1 | 11/2011 |

OTHER PUBLICATIONS

Mar. 21, 2025 Extended Search Report issued in European Patent Application No. 22876229.0.

\* cited by examiner

VEHICLE DRIVE DEVICE

FIELD

The present disclosure relates to a vehicle drive device including a rotary electric machine to be a drive power source for wheels, a parking assembly, and a case accommodating the vehicle drive device and the parking assembly.

BACKGROUND

An example vehicle drive device is described in Patent Literature 1 below. Reference signs in parentheses used below in describing the background and the technical problem are the reference signs in Patent Literature 1.

A vehicle drive device described in Patent Literature 1 includes a first power transmission (30, 41, 42, 45) that transmits power between a rotary electric machine and wheels, and a reservoir (77) to store oil included in a case 9 (refer to FIG. 3 in Patent Literature 1). The vehicle drive device described in Patent Literature 1 includes a parking assembly (52) including a parking gear (51), an engagement member (62) selectively engageable with the parking gear, and a second power transmission that transmits power to the engagement member (refer to FIG. 2 in Patent Literature 1). The second power transmission includes, for example, a transmission shaft (56) extending across the outside and the inside of the case (4) and rotatably supported about its axis.

CITATION LIST

Patent Literature

Patent Literature 1: WO 2011/141947

BRIEF SUMMARY

Technical Problem

The vehicle drive device described in Patent Literature 1 includes the first power transmission (30, 41, 42, 45) and the second power transmission located below the reservoir (77) and aligned in a front-rear direction (lateral direction in FIG. 2 in Patent Literature 1) that is perpendicular to an axial direction of the rotary electric machine when viewed vertically. Thus, the vehicle drive device cannot be smaller in the front-rear direction.

A vehicle drive device including a rotary electric machine and a parking assembly is to be smaller in the front-rear direction.

Solution to Problem

In response to the above, a vehicle drive device includes a rotary electric machine to be a drive power source for wheels, a first power transmission that transmits power between the rotary electric machine and the wheels, a parking assembly, a case accommodating the rotary electric machine, the parking assembly, and at least a part of the first power transmission, and a reservoir in the case. The reservoir stores oil. The parking assembly includes a parking gear in a rotary member included in the first power transmission and movable with the wheels, an engagement member selectively engageable with the parking gear, and a second power transmission that transmits power to the engagement member. The parking gear is coaxial with the rotary electric machine. The reservoir and the second power transmission are located above the first power transmission. An area of the reservoir in a front-rear direction, an area of the first power transmission in the front-rear direction, and an area of the second power transmission in the front-rear direction overlap an area of the rotary electric machine in the front-rear direction, where the front-rear direction is a direction perpendicular to an axial direction of the rotary electric machine when viewed in a vertical direction.

In this structure with the above aspect, the reservoir and the second power transmission are located above the first power transmission. The area of the reservoir in the front-rear direction, the area of the first power transmission in the front-rear direction, and the area of the second power transmission in the front-rear direction overlap the area of the rotary electric machine in the front-rear direction. Thus, the areas of the reservoir, the first power transmission, and the second power transmission are located within an area relatively near the rotation axis of the rotary electric machine in the front-rear direction. This allows the vehicle drive device including the rotary electric machine and the parking assembly to be smaller in the front-rear direction.

DETAILED DESCRIPTION

Figure 1:
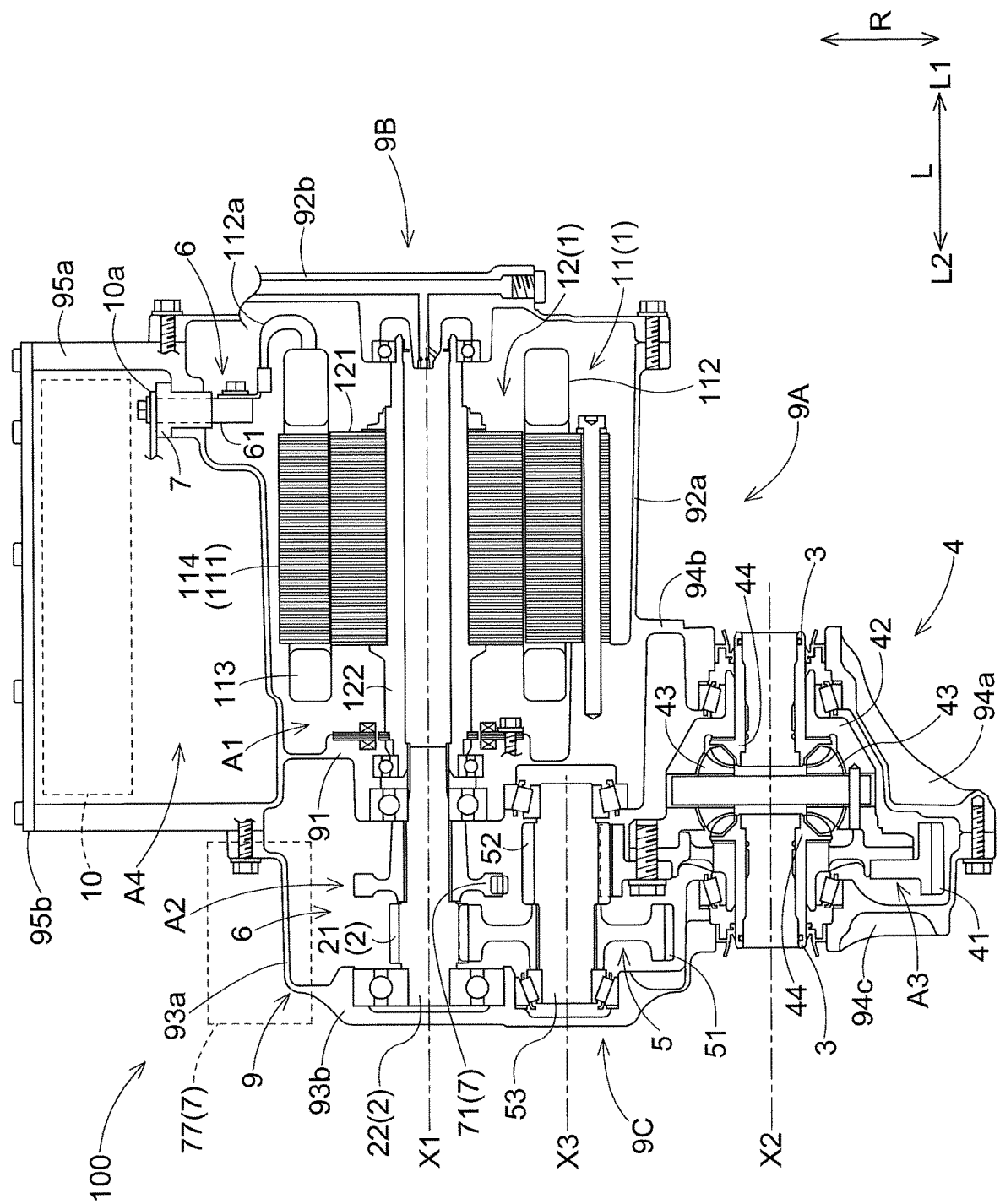
FIG. 1 is a cross-sectional view of a vehicle drive device according to an embodiment taken in an axial direction.
Figure 2:
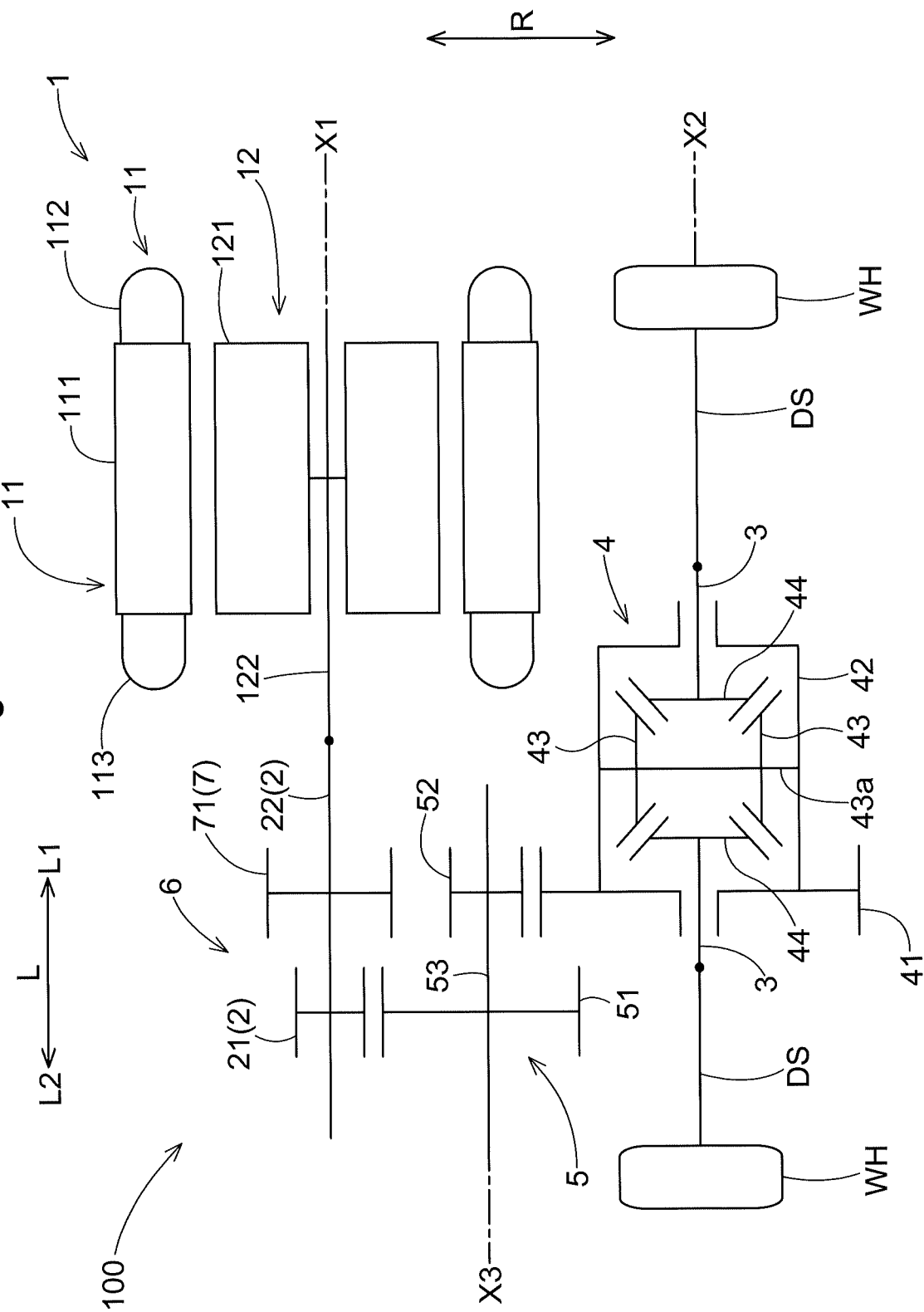
FIG. 2 is a skeleton diagram of the vehicle drive device according to the embodiment.

A vehicle drive device 100 according to an embodiment will now be described with reference to the drawings. As shown in FIGS. 1 and 2, the vehicle drive device 100 includes a rotary electric machine 1, a first power transmission 6, a parking assembly 7, and a case 9. In the present embodiment, the vehicle drive device 100 further includes an inverter 10.

The rotary electric machine 1 is to be a drive power source for wheels WH (refer to FIG. 2). The rotary electric machine 1 includes a stator 11 and a rotor 12 supported in a manner rotatable relative to the stator 11. The rotary electric machine 1 functions as a motor (electric motor) that receives electricity to generate power and as a generator (electric generator) that receives power to generate electricity. More specifically, the rotary electric machine 1 is electrically connected to an electric storage device (not shown) such as a battery or a capacitor. The rotary electric machine 1 runs on electricity stored in the electric storage device to generate a driving force. The rotary electric machine 1 also generates electricity from a driving force transmitted from the wheels WH and charges the electric storage device.

The inverter 10 controls the rotary electric machine 1. In the present embodiment, the inverter 10 is electrically connected to the rotary electric machine 1 and the electric storage device described above and converts power between direct current (DC) for the electric storage device and polyphase (three-phase in this example) alternating current (AC) for the rotary electric machine 1. In this example, the inverter 10 includes a switching device unit including multiple switching devices forming an inverter circuit, a smoothing capacitor for smoothing a voltage from a DC power supply in the inverter circuit, and a control board for controlling the inverter circuit.

The first power transmission 6 transmits power between the rotary electric machine 1 and the wheels WH. In the present embodiment, the first power transmission 6 includes an input member 2, a pair of output members 3, a differential gear assembly 4, and a counter gear assembly 5.

The parking assembly 7 includes a parking gear 71 in a rotary member included in the first power transmission 6 and movable with the wheels WH. In the present embodiment, the parking gear 71 is located in the input member 2.

The parking gear 71 is located on a first axis X1 as the rotation axis of the rotor 12. In other words, the parking gear 71 is coaxial with the rotary electric machine 1. The input member 2 is also located on the first axis X1 in the present embodiment. In the present embodiment, the pair of output members 3 and the differential gear assembly 4 are located on a second axis X2 different from the first axis X1. The counter gear assembly 5 is located on a third axis X3 different from the first axis X1 and the second axis X2 in the present embodiment. In this example, the axes X1 to X3 are parallel to one another.

The direction parallel to the axes X1 to X3 is hereafter referred to as an axial direction L for the vehicle drive device 100. One direction in the axial direction L is referred to as a first axial direction L1, and the opposite direction is referred to as a second axial direction L2. In the present embodiment, the rotary electric machine 1 is located in the first axial direction L1 from the input member 2 in the axial direction L. The direction opposite to the first axial direction L1 is referred to as the second axial direction L2. The directions perpendicular to the axes X1 to X3 are referred to as radial directions R of the axes. A radial direction R of any of the axes or a radial direction R of an apparent reference axis may be simply referred to as a radial direction R.

As shown in FIG. 1, the case 9 accommodates the rotary electric machine 1 and the parking assembly 7. The case 9 further accommodates at least a part of the first power transmission 6. In the present embodiment, the case 9 also accommodates the input member 2, the pair of output members 3, the differential gear assembly 4, and the counter gear assembly 5. The pair of output members 3 are accommodated in the case 9 with parts of the output members 3 exposed outside the case 9.

The case 9 includes a first compartment A1, a second compartment A2, a third compartment A3, and a fourth compartment A4. In the present embodiment, the first compartment A1 is a space accommodating the rotary electric machine 1. The second compartment A2 is a space accommodating the input member 2 and the counter gear assembly 5. The third compartment A3 is a space accommodating the pair of output members 3 and the differential gear assembly 4. The fourth compartment A4 is a space accommodating the inverter 10.

In the present embodiment, the case 9 includes a partition wall 91, a first peripheral wall 92a, a first side wall 92b, a second peripheral wall 93a, a second side wall 93b, a third peripheral wall 94a, a third side wall 94b, a fourth side wall 94c, a compartment wall 95a, and a lid 95b.

The partition wall 91 separates the first compartment A1 and the second compartment A2. In the present embodiment, the partition wall 91 extends in the radial direction R. In other words, the partition wall 91 separates the first compartment A1 and the second compartment A2 in the axial direction L.

The first peripheral wall 92a covers the rotary electric machine 1 from outside in the radial direction R. The first side wall 92b covers an end of the rotary electric machine 1 in the first axial direction L1. In the present embodiment, the first peripheral wall 92a is cylindrical and defines an opening in the first axial direction L1. The opening defined by the first peripheral wall 92a in the first axial direction L1 is covered with the first side wall 92b. The first peripheral wall 92a is integral with the partition wall 91 in its portion located in the second axial direction L2 from the rotary electric machine 1. In this example, the partition wall 91, the first peripheral wall 92a, the third peripheral wall 94a, the third side wall 94b, and the compartment wall 95a integrally form a first case portion 9A. A second case portion 9B including the first side wall 92b is joined to the first case portion 9A from a position in the first axial direction L1.

The second peripheral wall 93a covers the input member 2 and the counter gear assembly 5 from outside in the radial direction R. The second side wall 93b covers ends of the input member 2 and the counter gear assembly 5 in the second axial direction L2. In the present embodiment, the second peripheral wall 93a is integral with a portion of the second side wall 93b located in the second axial direction L2 from the input member 2 and the counter gear assembly 5. In this example, the second peripheral wall 93a, the second side wall 93b, and the fourth side wall 94c integrally form a third case portion 9C. The third case portion 9C is joined to the first case portion 9A from a position in the second axial direction L2. Thus, the first case portion 9A (partition wall 91) covers an opening defined by the second peripheral wall 93a in the first axial direction L1.

The third peripheral wall 94a covers the pair of output members 3 and the differential gear assembly 4 from outside in the radial direction R. The third side wall 94b covers an end of the differential gear assembly 4 in the first axial direction L1. The fourth side wall 94c covers an end of the differential gear assembly 4 in the second axial direction L2. In the present embodiment, the third peripheral wall 94a and the third side wall 94b are integral with the first case portion 9A. The third peripheral wall 94a defines, in the second axial direction L2, an opening that is covered with the fourth side wall 94c. As described above, the fourth side wall 94c is integral with the second peripheral wall 93a and the second side wall 93b.

In the present embodiment, the first compartment A1 is defined by the partition wall 91, the first peripheral wall 92a, and the first side wall 92b. In other words, the partition wall 91, the first peripheral wall 92a, and the first side wall 92b in the case 9 surround the space defined as the first compartment A1.

In the present embodiment, the second compartment A2 is defined by the partition wall 91, the second peripheral wall 93a, and the second side wall 93b. In other words, the partition wall 91, the second peripheral wall 93a, and the second side wall 93b in the case 9 surround the space defined as the second compartment A2. In the present embodiment, the third compartment A3 is defined by the third peripheral wall 94a, the third side wall 94b, and the fourth side wall 94c. In other words, the third peripheral wall 94a, the third side wall 94b, and the fourth side wall 94c in the case 9 surround the space defined as the third compartment A3. In the present embodiment, the second compartment A2 and the third compartment A3 are continuous with each other.

In the present embodiment, the fourth compartment A4 is defined by the compartment wall 95a and the lid 95b. In other words, the compartment wall 95*a* and the lid 95*b* in the case 9 surround the space defined as the fourth compartment A4.

The compartment wall 95*a* is cylindrical and surrounds sides of the inverter 10. In the present embodiment, the compartment wall 95*a* extends, in an in-vehicle state, upward from the first peripheral wall 92*a* and the second peripheral wall 93*a*, defining an opening for the inverter 10 to be placed into or removed from the fourth compartment A4. The in-vehicle state herein refers to the vehicle drive device 100 being mounted on a vehicle. As described above, the compartment wall 95*a* is integral with the partition wall 91, the first peripheral wall 92*a*, the third peripheral wall 94*a*, and the third side wall 94*b*.

The lid 95*b* covers the opening defined by the compartment wall 95*a*. In the present embodiment, the lid 95*b* is attachable to and detachable from the compartment wall 95*a*.

The stator 11 in the rotary electric machine 1 includes a cylindrical stator core 111. The stator core 111 is fixed to a nonrotatable member. In the present embodiment, the stator core 111 is fixed to the first peripheral wall 92*a* of the case 9 as the nonrotatable member. The rotor 12 in the rotary electric machine 1 includes a cylindrical rotor core 121. The rotor core 121 is supported in a manner rotatable relative to the stator core 111. In the present embodiment, the rotor 12 further includes a rotor shaft 122 connected to the rotor core 121 to rotate integrally with the rotor core 121. The rotor shaft 122 extends along the first axis X1. In the present embodiment, the rotor shaft 122 is cylindrical and has the first axis X1 as its axis.

In the present embodiment, the rotary electric machine 1 is an inner-rotor rotary electric machine. In other words, the stator 11 is located outward from the rotor 12 in the radial direction R. Thus, the stator core 111 is located outward from the rotor core 121 in the radial direction R. The rotor shaft 122 is located inward from the rotor core 121 in the radial direction R.

In the present embodiment, the rotary electric machine 1 is a rotary electric machine operable with a rotating field. Thus, the stator core 111 is wound with a stator coil. In the present embodiment, the stator coil is wound around the stator core 111 with a first coil end 112 protruding from the stator core 111 in the first axial direction L1 and a second coil end 113 protruding from the stator core 111 in the second axial direction L2. Although not shown, the rotor core 121 includes permanent magnets.

The input member 2 is drivably connected to the rotor 12 in the rotary electric machine 1. In the present embodiment, the input member 2 includes an input gear 21 and an input shaft 22.

Being drivably connected herein refers to two rotatable elements being connected to allow transmission of a driving force, including the two rotatable elements being connected to rotate integrally or the two rotatable elements being connected to allow transmission of a driving force with one or more transmission members in between. Examples of the transmission member include a shaft, a gear assembly, and a chain, which are members for transmitting rotation at a constant speed or at a variable speed. Examples of the transmission member may include a friction engagement device or an intermeshing engagement device, which are engagement devices for transmitting rotation and a driving force selectively.

The input gear 21 is connected to the input shaft 22 to rotate integrally with the input shaft 22. In the example shown in FIG. 1, the input gear 21 is integral with the input shaft 22.

The input shaft 22 extends along the first axis X1. In the present embodiment, the input shaft 22 extends in the axial direction L through the partition wall 91 in the case 9 and is connected to the rotor shaft 122 to rotate integrally with the rotor shaft 122. In the example shown in FIG. 1, the input shaft 22 has an end in the first axial direction L1 located inward in the radial direction R from an end of the rotor shaft 122 in the second axial direction L2. These ends are engaged with splines and are connected to each other to rotate integrally.

In the present embodiment, the input shaft 22 is connected to the parking gear 71 to rotate integrally with the parking gear 71. In the example shown in FIG. 1, the input shaft 22 and the parking gear 71 are connected to each other with splines.

The counter gear assembly 5 includes a counter input gear 51 that meshes with the input gear 21, a counter output gear 52 rotatable integrally with the counter input gear 51, and a counter shaft 53 connecting the gears 51 and 52.

The counter input gear 51 and the counter output gear 52 are connected with the counter shaft 53 in between to rotate integrally. The counter shaft 53 extends along the third axis X3. In the example shown in FIG. 1, the counter input gear 51 is connected to the counter shaft 53 with splines. The counter output gear 52 is integral with the counter shaft 53. In the example shown in FIG. 1, the counter output gear 52 has a smaller diameter than the counter input gear 51. The area of the counter output gear 52 in the axial direction L overlaps the area of the parking gear 71 in the axial direction L.

The differential gear assembly 4 distributes rotation transmitted from the input member 2 to the pair of output members 3. In the present embodiment, the differential gear assembly 4 includes a differential input gear 41 as an input element for the differential gear assembly 4. The differential gear assembly 4 thus distributes rotation of the differential input gear 41 to the pair of output members 3.

In the present embodiment, the differential gear assembly 4 further includes a differential case 42, a pair of pinion gears 43, and a pair of side gears 44. The pair of pinion gears 43 and the pair of side gears 44 are bevel gears.

The differential case 42 is a hollow member accommodating the pair of pinion gears 43 and the pair of side gears 44. The differential case 42 is connected to the differential input gear 41 to rotate integrally with the differential input gear 41. In the example shown in FIG. 1, the differential input gear 41 is connected to the differential case 42 by bolt fastening.

The pair of pinion gears 43 face each other at an interval in the radial direction R of the second axis X2. The pair of pinion gears 43 are attached to a pinion shaft 43*a* that is supported to rotate integrally with the differential case 42. The pair of pinion gears 43 can each rotate about the pinion shaft 43*a* and revolve around the second axis X2.

The pair of side gears 44 mesh with the pair of pinion gears 43. The pair of side gears 44 rotate about the second axis X2 as their rotation axis. The pair of side gears 44 face each other with the pinion shaft 43*a* in between at an interval in the axial direction L.

The pair of output members 3 are drivably connected to the respective wheels WH (refer to FIG. 2). In the present embodiment, the pair of output members 3 are connected to the respective side gears 44 to rotate integrally with the respective side gears 44. In the present embodiment, one of the pair of output members 3 extends through the third side wall 94b in the axial direction L, and the other of the output members 3 extends through the fourth side wall 94c in the axial direction L. The pair of output members 3 are each connected to a drive shaft DS that is drivably connected to the corresponding wheel WH to rotate integrally with the drive shaft DS. In the example shown in FIG. 1, each of the pair of output members 3 is cylindrical and has the second axis X2 as its axis. The pair of output members 3 each receive the corresponding drive shaft DS inward in the radial direction R. The output member 3 and the drive shaft DS are connected to each other with splines.

A vertical direction for the vehicle drive device 100 in the in-vehicle state is hereafter referred to as a vertical direction V. Upward and downward in the vertical direction V are simply referred to as upward and downward. A direction perpendicular to the axial direction L when viewed in the vertical direction V is referred to as a front-rear direction W. One direction in the front-rear direction W is referred to as a rearward direction W1, and the other direction in the front-rear direction W is referred to as a frontward direction W2.

Figure 3:
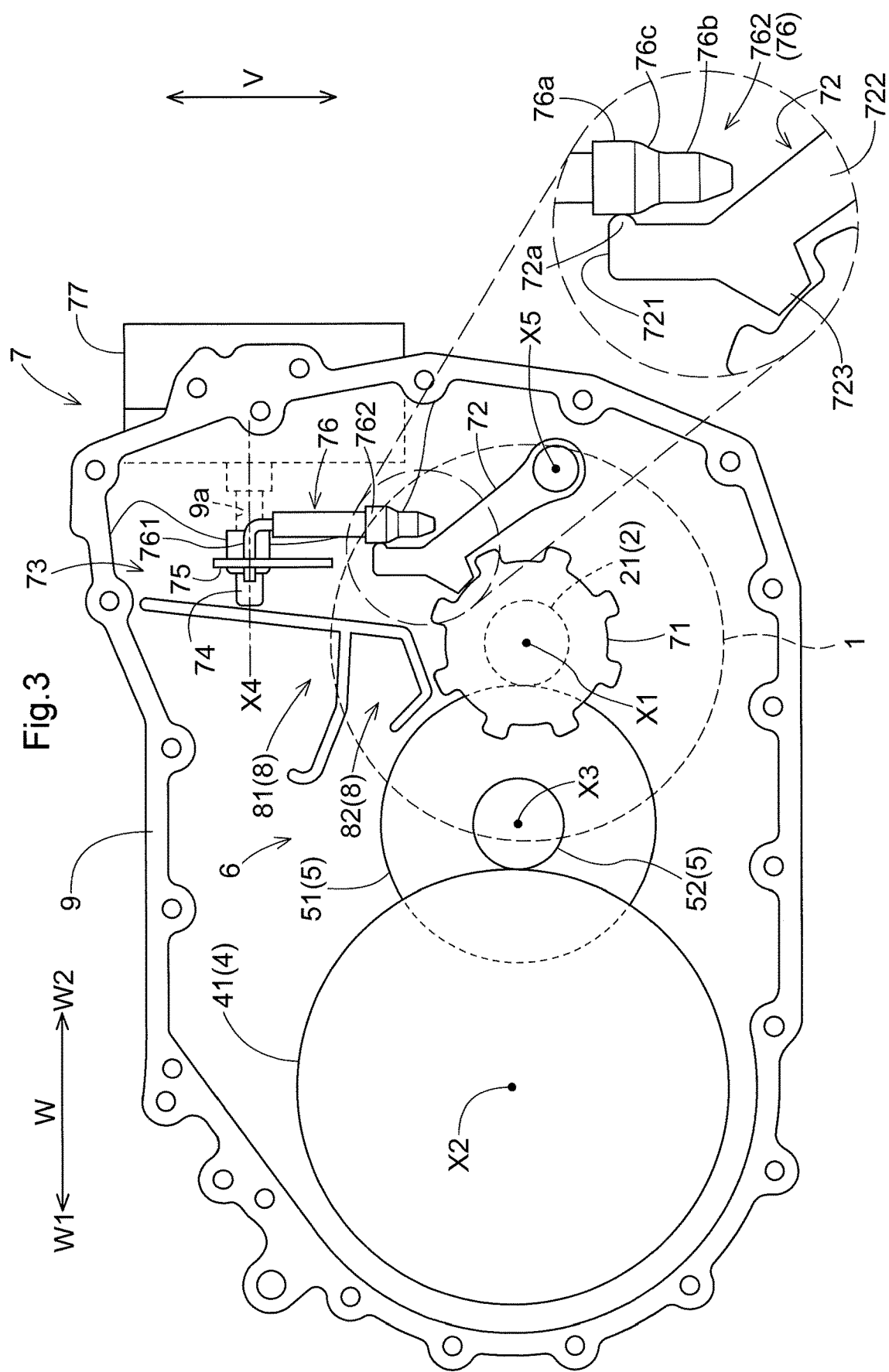
FIG. 3 is a diagram of the vehicle drive device according to the embodiment, describing the positional relationship between its elements when viewed axially.

In the present embodiment, as shown in FIG. 3, the area of the first power transmission 6 in the vertical direction V overlaps the area of the rotary electric machine 1 in the vertical direction V. In the example shown in FIG. 3, the areas of the input member 2, the differential gear assembly 4, and the counter gear assembly 5 included in the first power transmission 6 in the vertical direction V overlap the area of the rotary electric machine 1 in the vertical direction V.

As shown in FIG. 3, the parking assembly 7 includes an engagement member 72 selectively engageable with the parking gear 71, and a second power transmission 73 that transmits power to the engagement member 72.

In the present embodiment, the second power transmission 73 includes a transmission shaft 74, a connector 75, and a pressing member 76.

The transmission shaft 74 is rotatably supported about a fourth axis X4 as an axis of the transmission shaft 74. The transmission shaft 74 extends through a connection hole 9a that connects the outside and the inside of the case 9. In the present embodiment, the fourth axis X4 extends in the front-rear direction W. The connection hole 9a thus extends through the case 9 in the front-rear direction W. Although not shown, the connection hole 9a includes a seal that seals, in an oil-tight manner, a space between the connection hole 9a and the transmission shaft 74.

The connector 75 connects the pressing member 76 and the transmission shaft 74. The connector 75 is connected to the transmission shaft 74 to rotate integrally with the transmission shaft 74. The connector 75 also supports the pressing member 76 in a rotatable manner. In the present embodiment, the transmission shaft 74 extends through the connector 75 in the front-rear direction W. The pressing member 76 is supported by the connector 75 to rotate about an axis extending in the front-rear direction W different from the fourth axis X4 as the rotation axis of the transmission shaft 74. Thus, in response to the rotation of the transmission shaft 74, the pressing member 76 moves in the vertical direction V with the connector 75 in between. Although not shown, the connector 75 in this example is a detent lever that maintains its orientation with a detent spring and includes protrusions and recesses engageable with a roller in the detent spring.

The pressing member 76 presses a press portion 721 included in the engagement member 72. In the present embodiment, the pressing member 76 includes a connecting portion 761 and a cam 762.

The connecting portion 761 is rotatably connected to the connector 75. In the present embodiment, the connecting portion 761 extends through the connector 75 in the front-rear direction W and is supported by the connector 75.

The cam 762 changes the orientation of the engagement member 72 along the shape of the surface of the cam 762. In the present embodiment, the cam 762 is located below the connecting portion 761. The cam 762 extends in the vertical direction V.

As shown in FIG. 3, the vehicle drive device 100 includes a reservoir 8. The reservoir 8 is in the case 9. The reservoir 8 stores oil. In the present embodiment, the reservoir 8 includes a first reservoir 81 and a second reservoir 82 located below the first reservoir 81. In this example, the reservoir 8 is a catch tank that receives and stores oil splashed by, for example, the differential input gear 41 and the counter input gear 51 and supplies oil to a space including supply targets (e.g., bearings, gear meshing portions, the rotor 12 in the rotary electric machine 1, the first coil end 112, and the second coil end 113).

The reservoir 8 and the second power transmission 73 are located above the first power transmission 6. In the example shown in FIG. 3, the first reservoir 81 is located above the input member 2 and the counter gear assembly 5 in the first power transmission 6. The second reservoir 82 is located above the input member 2 in the first power transmission 6. In the example shown in FIG. 3, the transmission shaft 74 in the second power transmission 73 is located above the input member 2, the differential gear assembly 4, and the counter gear assembly 5 in the first power transmission 6. The connector 75 in the second power transmission 73 is located above the input member 2 and the counter gear assembly 5 in the first power transmission 6. The pressing member 76 in the second power transmission 73 is above the input member 2 in the first power transmission 6.

The area of the reservoir 8 in the front-rear direction W, the area of the first power transmission 6 in the front-rear direction W, and the area of the second power transmission 73 in the front-rear direction W overlap the area of the rotary electric machine 1 in the front-rear direction W. In the example shown in FIG. 3, the areas of the first reservoir 81 and the second reservoir 82 in the front-rear direction W fully overlap the area of the rotary electric machine 1 in the front-rear direction W. The area of the input member 2 in the first power transmission 6 in the front-rear direction W fully overlaps the area of the rotary electric machine 1 in the front-rear direction W, and the area of the counter gear assembly 5 in the first power transmission 6 in the front-rear direction W partially overlaps the area of the rotary electric machine 1 in the front-rear direction W. The areas of the connector 75 and the pressing member 76 in the second power transmission 73 in the front-rear direction W fully overlaps the area of the rotary electric machine 1 in the front-rear direction W, and the area of the transmission shaft 74 in the second power transmission 73 in the front-rear direction W partially overlaps the area of the rotary electric machine 1 in the front-rear direction W.

As described above, the vehicle drive device 100 includes the rotary electric machine 1 to be the drive power source for the wheels WH, the first power transmission 6 that transmits power between the rotary electric machine 1 and the wheels WH, the parking assembly 7, the case 9 accommodating the rotary electric machine 1, the parking assembly 7, and at least a part of the first power transmission 6, and the reservoir 8 in the case 9. The reservoir 8 stores oil. The parking assembly 7 includes the parking gear 71 in the rotary member (input member 2 in this example) included in the first power transmission 6 and movable with the wheels WH, the engagement member 72 selectively engageable with the parking gear 71, and the second power transmission 73 that transmits power to the engagement member 72. The parking gear 71 is coaxial with the rotary electric machine 1. The reservoir 8 and the second power transmission 73 are located above the first power transmission 6. The area of the reservoir 8 in the front-rear direction W, the area of the first power transmission 6 in the front-rear direction W, and the area of the second power transmission 73 in the front-rear direction W overlap the area of the rotary electric machine 1 in the front-rear direction W, where the front-rear direction W is a direction perpendicular to the axial direction L of the rotary electric machine 1 when viewed in the vertical direction V.

In this structure, the reservoir 8 and the second power transmission 73 are located above the first power transmission 6. The area of the reservoir 8 in the front-rear direction W, the area of the first power transmission 6 in the front-rear direction W, and the area of the second power transmission 73 in the front-rear direction W overlap the area of the rotary electric machine 1 in the front-rear direction W. Thus, the areas of the reservoir 8 and the second power transmission 73 can be located within an area relatively near the rotation axis (first axis X1) of the rotary electric machine 1 in the front-rear direction W. This allows the vehicle drive device 100 including the rotary electric machine 1 and the parking assembly 7 to be smaller in the front-rear direction W.

As shown in FIG. 3, the reservoir 8 in the present embodiment is located above the parking gear 71 and overlaps the second power transmission 73 in the parking assembly 7 when viewed in the front-rear direction W. In the example shown in FIG. 3, the first reservoir 81 overlaps the connector 75 and the pressing member 76 in the second power transmission 73 when viewed in the front-rear direction, and the second reservoir 82 overlaps the pressing member 76 in the second power transmission 73 when viewed in the front-rear direction.

Thus, in the present embodiment, the reservoir 8 is located above the parking gear 71 and overlaps the second power transmission 73 when viewed in the front-rear direction W.

This structure allows a space above the parking gear 71 to receive the reservoir 8 and the second power transmission 73. Thus, the vehicle drive device 100 may easily be smaller.

In the present embodiment, the differential gear assembly 4 is located in the rearward direction W1 from the reservoir 8. The second power transmission 73 is located in the frontward direction W2 from the reservoir 8.

Thus, in the present embodiment, the first power transmission 6 includes the input member 2 drivably connected to the rotor 12 in the rotary electric machine 1, the pair of output members 3 drivably connected to the respective wheels WH, and the differential gear assembly 4 that distributes rotation transmitted from the input member 2 to the pair of output members 3. The differential gear assembly 4 is located opposite to the second power transmission 73 across the reservoir 8 in the front-rear direction W.

This structure is more likely to include spaces for receiving the differential gear assembly 4 and the second power transmission 73 than a structure in which the differential gear assembly 4 and the second power transmission 73 are located in the same direction from the reservoir 8 in the front-rear direction W.

In the present embodiment, the second power transmission 73 overlaps the rotary electric machine 1 when viewed in the axial direction L. In the example shown in FIG. 3, the pressing member 76 in the second power transmission 73 overlaps the rotary electric machine 1 when viewed axially. Two elements overlapping when viewed in a specific direction herein refers to two elements each having at least a portion to intersect with an imaginary line parallel to the specific viewing direction being moved to a direction perpendicular to the imaginary line.

This structure is more likely to downsize the vehicle drive device 100 in the radial direction R, which includes the front-rear direction W and the vertical direction V, of the rotary electric machine 1 than a structure in which the second power transmission 73 has no overlap with the rotary electric machine 1 when viewed in the axial direction L.

In the present embodiment, the transmission shaft 74 in the second power transmission 73 extends through the connection hole 9a, and the area of the connection hole 9a in the front-rear direction W overlaps the area of the rotary electric machine 1 in the front-rear direction W.

Thus, in the present embodiment, the second power transmission 73 includes the transmission shaft 74 extending through the connection hole 9a connecting the outside and the inside of the case 9 and rotatably supported about its axis. The area of the rotary electric machine 1 in the front-rear direction W overlaps the area of the connection hole 9a in the front-rear direction W.

In this structure, the transmission shaft 74 extending through the connection hole 9a is not aligned with the rotary electric machine 1 in the front-rear direction W. Thus, the vehicle drive device 100 may be smaller in the front-rear direction W.

In the present embodiment, the press portion 721 in the engagement member 72 extends in the vertical direction V. In other words, the press portion 721 extends in a direction in which the pressing member 76 moves. In the example shown in FIG. 3, the press portion 721 is between the first axis X1 and the pressing member 76 in the front-rear direction W.

Thus, in the present embodiment, the second power transmission 73 includes the transmission shaft 74 extending through the connection hole 9a connecting the outside and the inside of the case 9 and rotatably supported about its axis, and the pressing member 76 movable in response to the rotation of the transmission shaft 74 to press the press portion 721 included in the engagement member 72. The press portion 721 extends in the direction in which the pressing member 76 moves.

This structure is more likely to have a greater distance between the engagement member 72 and the transmission shaft 74 in the vertical direction V than a structure including, for example, the press portion 721 in the engagement member 72 extending in a direction (e.g., front-rear direction W) perpendicular to a direction (vertical direction V in this example) in which the pressing member 76 moves. Thus, the connection hole 9a receiving the transmission shaft 74 may easily be located relatively higher. The sealing structure in the connection hole 9a is thus less likely to be affected by, for example, oil in the case 9 or water outside the case 9 than being in a connection hole 9a at a lower position, thus easily simplifying the sealing structure.

In the present embodiment, the cam 762 has a surface including a first surface 76a, a second surface 76b, and a third surface 76c. The first surface 76a and the second surface 76b are each cylindrical with an axis extending in the vertical direction V. The second surface 76b is located below the first surface 76a. The second surface 76b has a smaller outer diameter than the first surface 76a. The third surface 76c defines a conical frustum connecting the first surface 76a and the second surface 76b.

In the present embodiment, the press portion 721 includes a protrusion 72a in contact with one of the first surface 76a, the second surface 76b, and the third surface 76c of the cam 762 in the front-rear direction W. The cam 762 moves to cause the protrusion 72a to slide on the first surface 76a, the second surface 76b, and the third surface 76c in the vertical direction V. When the protrusion 72a is in contact with the first surface 76a, the engagement member 72 engages with the parking gear 71. When the protrusion 72a is in contact with the second surface 76b, the engagement member 72 does not engage with the parking gear 71.

In the present embodiment, the engagement member 72 further includes a pivotable portion 722 and an engagement portion 723, in addition to the press portion 721 above.

The pivotable portion 722 is supported in a manner pivotable relative to the case 9 about a fifth axis X5. In the present embodiment, the fifth axis X5 is located opposite to the differential gear assembly 4 across the parking gear 71 in the front-rear direction W. More specifically, in the present embodiment, the differential gear assembly 4 is located in the rearward direction W1 from the parking gear 71, and the fifth axis X5 is located in the frontward direction W2 from the parking gear 71. The fifth axis X5 extends in the axial direction L. The fifth axis X5 is located below the first axis X1 as the rotation axis of the parking gear 71.

Thus, in the present embodiment, the first power transmission 6 includes the input member 2 drivably connected to the rotor 12 in the rotary electric machine 1, the pair of output members 3 drivably connected to the respective wheels WH, and the differential gear assembly 4 that distributes rotation transmitted from the input member 2 to the pair of output members 3. The differential gear assembly 4 is located in the rearward direction W1, or in one direction in the front-rear direction W, from the parking gear 71. The engagement member 72 is supported in a manner pivotable relative to the case 9 about a pivot axis located in the frontward direction W2, or in the other direction in the front-rear direction W, from the parking gear 71.

This structure is more likely to include a larger space above the parking gear 71 than a structure in which, for example, the engagement member 72 includes a pivot axis located above the parking gear 71. Thus, the vehicle drive device 100 including the reservoir 8 above the parking gear 71 is less likely to be upsized, allowing the reservoir 8 to be easily aligned with the second power transmission 73 in the front-rear direction W.

In the present embodiment, the pivotable portion 722 extends with its portion nearer the parking gear 71 being higher than its portion near the fifth axis X5. In the example shown in FIG. 3, the pivotable portion 722 extends from the fifth axis X5 to an area between the first axis X1 and the pressing member 76 in the front-rear direction W and above the first axis X1 as the rotation axis of the parking gear 71. The press portion 721 extends upward from the upper end of the pivotable portion 722.

The engagement portion 723 is engageable with the parking gear 71. In the present embodiment, the engagement portion 723 is above the first axis X1 as the rotation axis of the parking gear 71. In the example shown in FIG. 3, the engagement portion 723 protrudes from the upper end of the pivotable portion 722 toward the parking gear 71. The engagement portion 723 is engageable with one of recesses on the parking gear 71.

Thus, in the present embodiment, the engagement member 72 is engageable with the parking gear 71 above the rotation axis of the parking gear 71.

In this structure, the second power transmission 73 that transmits power to the engagement member 72 is easily located above the parking gear 71. The connection hole 9a receiving the transmission shaft 74 in the second power transmission 73 may thus easily be located relatively higher. The sealing structure in the connection hole 9a is thus less likely to be affected by, for example, oil in the case 9 or water outside the case 9 than being in a connection hole 9a at a lower position, thus easily simplifying the sealing structure.

In the present embodiment, as shown in FIG. 3, the parking assembly 7 further includes a drive source 77 that drives the transmission shaft 74 to rotate. The drive source 77 is located outside the case 9. The drive source 77 is connected to a portion of the transmission shaft 74, which is extending through the connection hole 9a, exposed outside from the case 9. In this example, the drive source 77 is an electric motor that drives the transmission shaft 74 to rotate about the fourth axis X4.

Thus, in the present embodiment, the second power transmission 73 includes the transmission shaft 74 extending through the connection hole 9a connecting the outside and the inside of the case 9 and rotatably supported about its axis. The parking assembly 7 further includes the drive source 77 that drives the transmission shaft 74 to rotate. The drive source 77 is located outside the case 9.

In this structure, power from the drive source 77 can rotate the transmission shaft 74 appropriately. This structure also allows easy attachment and detachment of the drive source 77.

In the present embodiment, the drive source 77 overlaps the second power transmission 73 when viewed in the front-rear direction W. In the example shown in FIGS. 3 and 4, the drive source 77 overlaps the transmission shaft 74 and the connector 75 in the second power transmission 73 when viewed in the front-rear direction.

This structure is more likely to downsize the vehicle drive device 100 in at least one of the vertical direction V or the axial direction L than a structure in which the drive source 77 has no overlap with the second power transmission 73 when viewed in the front-rear direction W.

Figure 4:
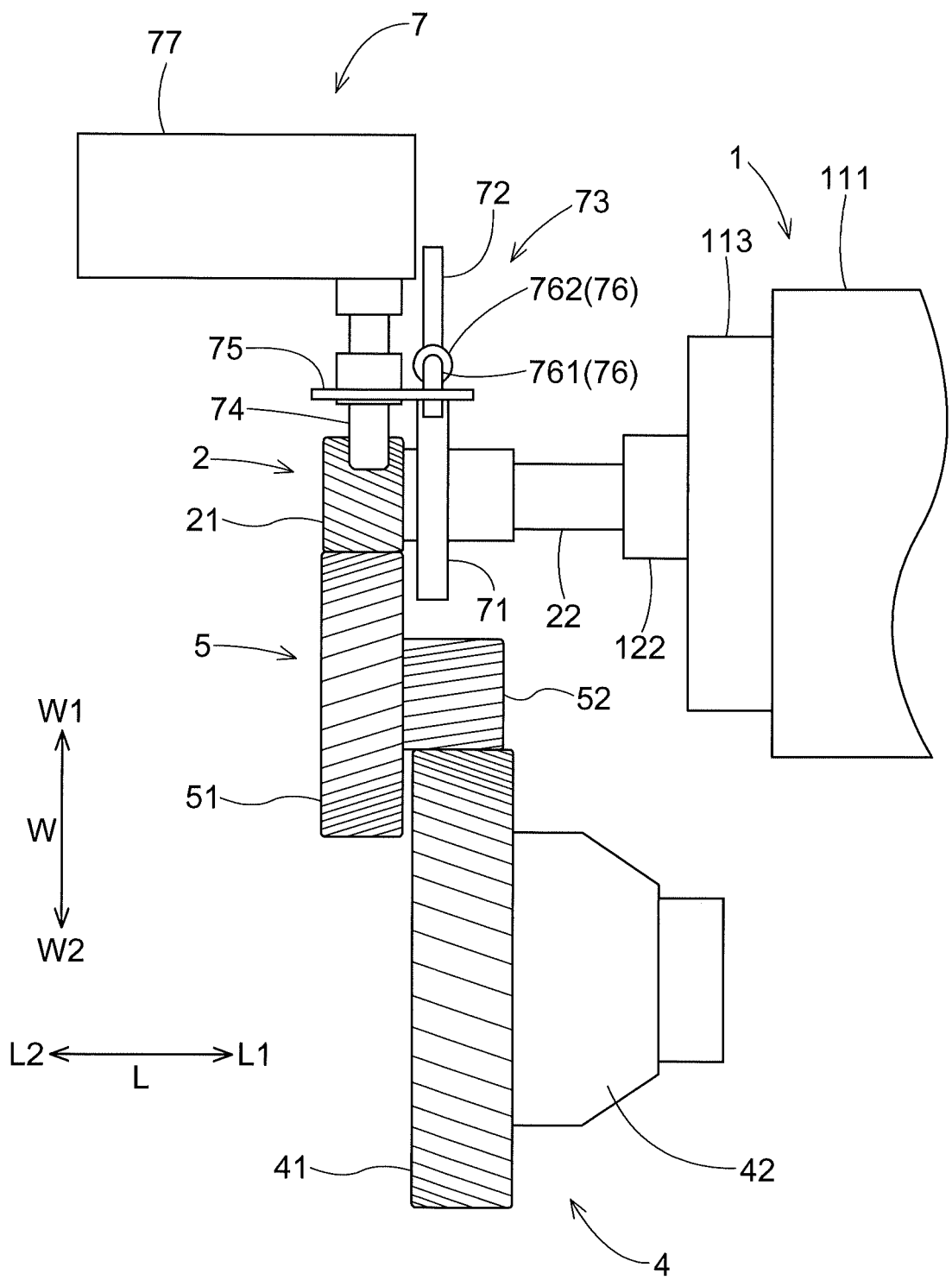
FIG. 4 is a diagram of the vehicle drive device according to the embodiment, describing the positional relationship between its elements when viewed vertically.

As shown in FIGS. 3 and 4, the second power transmission 73 in the present embodiment is located above the parking gear 71. The second power transmission 73 overlaps the parking gear 71 when viewed in the vertical direction V. In this example, the connector 75 and the pressing member 76 in the second power transmission 73 overlap the parking gear 71 when viewed vertically.

Thus, in the present embodiment, the second power transmission 73 is located above the parking gear 71 and overlaps the parking gear 71 when viewed in the vertical direction V.

This structure is more likely to downsize the vehicle drive device 100 in at least one of the axial direction L or the front-rear direction W than a structure in which the second power transmission 73 has no overlap with the parking gear 71 when viewed in the vertical direction V.

In this structure, the second power transmission 73 is located above the parking gear 71. The connection hole 9a receiving the transmission shaft 74 in the second power transmission 73 may thus easily be located relatively higher.

The sealing structure in the connection hole 9a is thus less likely to be affected by, for example, oil in the case 9 or water outside the case 9 than being in a connection hole 9a at a lower position, thus easily simplifying the sealing structure.

OTHER EMBODIMENTS (1) In the above embodiment, the transmission shaft 74 extends in the front-rear direction W. In some embodiments, the transmission shaft 74 may extend in, for example, the vertical direction V or in the axial direction L. In this case as well, with the transmission shaft 74 extending through the connection hole 9a, the area of the connection hole 9a in the front-rear direction W may overlap the area of the rotary electric machine 1 in the front-rear direction W.

(2) In the above embodiment, the pressing member 76 in the second power transmission 73 overlaps the rotary electric machine 1 when viewed in the axial direction L. In some embodiments, for example, both the connector 75 and the pressing member 76 may overlap the rotary electric machine 1 when viewed axially. In some embodiments, the second power transmission 73 may not fully overlap the rotary electric machine 1 when viewed axially.

(3) In the above embodiment, the connector 75 and the pressing member 76 in the second power transmission 73 overlap the parking gear 71 when viewed in the vertical direction V. In some embodiments, for example, the pressing member 76 may overlap the parking gear 71 when viewed vertically but the connector 75 may not. In some embodiments, the second power transmission 73 may not fully overlap the parking gear 71 when viewed vertically.

(4) In the above embodiment, the press portion 721 extends in a direction (the vertical direction V in this example) in which the pressing member 76 moves. In some embodiments, the press portion 721 may extend in a direction (e.g., the front-rear direction W or the axial direction L) different from the direction in which the pressing member 76 moves.

(5) In the above embodiment, the drive source 77 overlaps the transmission shaft 74 in the second power transmission 73 and the connector 75 when viewed in the front-rear direction W. In some embodiments, the drive source 77 may overlap, for example, the pressing member 76 when viewed in the front-rear direction. In some embodiments, the drive source 77 may not fully overlap the second power transmission 73 when viewed in the front-rear direction.

(6) In the above embodiment, the first reservoir 81 overlaps the connector 75 and the pressing member 76 in the second power transmission 73 when viewed in the front-rear direction, and the second reservoir 82 overlaps the pressing member 76 in the second power transmission 73 when viewed in the front-rear direction. In some embodiments, at least one of the first reservoir 81 or the second reservoir 82, for example, may not overlap the second power transmission 73 when viewed in the front-rear direction. The reservoir 8 may simply include one of the first reservoir 81 or the second reservoir 82. In some embodiments, the reservoir 8 may be eliminated.

(7) In the above embodiment, the engagement portion 723 in the engagement member 72 is located above the first axis X1 as the rotation axis of the parking gear 71. In some embodiments, the engagement portion 723 may be located below the first axis X1.

(8) In the above embodiment, the fifth axis X5 as the pivot axis of the engagement member 72 is located in the frontward direction W2 from the parking gear 71. In some embodiments, the fifth axis X5, for example, may be located above or below the parking gear 71 within a range that overlaps the parking gear 71 in the front-rear direction W.

(9) In the above embodiment, the differential gear assembly 4 is located opposite to the second power transmission 73 across the reservoir 8 in the front-rear direction W. In some embodiments, the differential gear assembly 4 may be located in the same direction as the second power transmission 73 W from the reservoir 8 in the front-rear direction.

(10) The structure described in the above embodiment may be combined with any other structures described in the other embodiments unless any contradiction arises. The embodiments described herein are merely illustrative in all respects and may be modified variously as appropriate without departing from the spirit and scope of the present disclosure.

OVERVIEW OF EMBODIMENTS

The vehicle drive device (100) described above will be overviewed below.

A vehicle drive device (100) includes a rotary electric machine (1) to be a drive power source for wheels (WH), a first power transmission (6) that transmits power between the rotary electric machine (1) and the wheels (WH), a parking assembly (7), a case (9) accommodating the rotary electric machine (1), the parking assembly (7), and at least a part of the first power transmission (6), and a reservoir (8) in the case (9). The reservoir (8) stores oil. The parking assembly (7) includes a parking gear (71) in a rotary member (2) included in the first power transmission (6) and movable with the wheels (WH), an engagement member (72) selectively engageable with the parking gear (71), and a second power transmission (73) that transmits power to the engagement member (72). The parking gear (71) is coaxial with the rotary electric machine (1). The reservoir (8) and the second power transmission (73) are located above the first power transmission (6). An area of the reservoir (8) in a front-rear direction (W), an area of the first power transmission (6) in the front-rear direction (W), and an area of the second power transmission (73) in the front-rear direction (W) overlap an area of the rotary electric machine (1) in the front-rear direction (W), where the front-rear direction (W) is a direction perpendicular to an axial direction (L) of the rotary electric machine (1) when viewed in a vertical direction (V).

In this structure, the reservoir (8) and the second power transmission (73) are located above the first power transmission (6). The area of the reservoir (8) in the front-rear direction (W), the area of the first power transmission (6) in the front-rear direction (W), and the area of the second power transmission (73) in the front-rear direction (W) overlap the area of the rotary electric machine (1) in the front-rear direction (W). Thus, the areas of the reservoir (8) and the second power transmission (73) may be located within an area relatively near the rotation axis (X1) of the rotary electric machine (1) in the front-rear direction (W). This allows the vehicle drive device (100) including the rotary electric machine (1) and the parking assembly (7) to be smaller in the front-rear direction (W).

The reservoir (8) may be above the parking gear (71) and may overlap the second power transmission (73) when viewed in the front-rear direction (W).

This structure allows a space above the parking gear (71) to receive the reservoir (8) and the second power transmission (73). Thus, the vehicle drive device (100) may easily be smaller.

In the above structure, the first power transmission (6) may include an input member (2) drivably connected to a rotor (12) in the rotary electric machine (1), a pair of output members (3) drivably connected to the respective wheels (WH), and a differential gear assembly (4) that distributes rotation transmitted from the input member (2) to the pair of output members (3). The differential gear assembly (4) may be located opposite to the second power transmission (73) across the reservoir (8) in the front-rear direction (W).

This structure is more likely to include spaces for receiving the differential gear assembly (4) and the second power transmission (73) than a structure in which a differential gear assembly (4) and the second power transmission (73) are located in the same direction from the reservoir (8) in the front-rear direction (W).

The second power transmission (73) may overlap the rotary electric machine (1) when viewed in the axial direction (L).

This structure is more likely to downsize the vehicle drive device (100) in the radial direction (R), which includes the front-rear direction (W) and the vertical direction (V), of the rotary electric machine (1) than a structure in which the second power transmission (73) has no overlap with the rotary electric machine (1) when viewed in the axial direction (L).

The second power transmission (73) may be located above the parking gear (71) and may overlap the parking gear (71) when viewed vertically.

This structure is more likely to downsize the vehicle drive device (100) in at least one of the axial direction (L) or the front-rear direction (W) than a structure in which the second power transmission (73) has no overlap with the parking gear (71) when viewed in the vertical direction (V).

In this structure, the second power transmission (73) is located above the parking gear (71). The connection hole (9a) receiving the transmission shaft (74) in the second power transmission (73) may thus easily be located relatively higher. The sealing structure in the connection hole (9a) is thus less likely to be affected by, for example, oil in the case (9) or water outside the case (9) than being in a connection hole (9a) at a lower position, thus easily simplifying the scaling structure.

The second power transmission (73) may include a transmission shaft (74) extending through a connection hole (9a) connecting an outside and an inside of the case (9) and rotatably supported about an axis of the transmission shaft (74). The area of the rotary electric machine (1) in the front-rear direction (W) may overlap an area of the connection hole (9a) in the front-rear direction (W).

In this structure, the transmission shaft (74) extending through the connection hole (9a) is not aligned with the rotary electric machine (1) in the front-rear direction (W). Thus, the vehicle drive device (100) may be smaller in the front-rear direction (W).

The second power transmission (73) may include a transmission shaft (74) extending through a connection hole (9a) connecting an outside and an inside of the case (9) and rotatably supported about an axis of the transmission shaft (74), and a pressing member (76) movable in response to rotation of the transmission shaft (74) to press a press portion (721) included in the engagement member (72). The press portion (721) may extend in a direction in which the pressing member (76) moves.

This structure is more likely to have a greater distance between the engagement member (72) and the transmission shaft (74) in the vertical direction (V) than a structure including, for example, the press portion (721) in the engagement member (72) extending in a direction perpendicular to the direction in which the pressing member (76) moves. Thus, the connection hole (9a) receiving the transmission shaft (74) may easily be located relatively higher. The sealing structure in the connection hole (9a) is thus less likely to be affected by, for example, oil in the case (9) or water outside the case (9) than being in a connection hole (9a) at a lower position, thus easily simplifying the sealing structure.

The second power transmission (73) may include a transmission shaft (74) extending through a connection hole (9a) connecting an outside and an inside of the case (9) and rotatably supported about an axis of the transmission shaft (74). The parking assembly (7) may further include a drive source (77) to drive the transmission shaft (74) to rotate. The drive source (77) may be located outside the case (9).

In this structure, power from the drive source (77) can rotate the transmission shaft (74) appropriately.

This structure also allows easy attachment and detachment of the drive source (77).

With the second power transmission (73) including the transmission shaft (74), the drive source (77) may overlap the second power transmission (73) when viewed in the front-rear direction (W).

This structure is more likely to downsize the vehicle drive device (100) in at least one of the vertical direction (V) or the axial direction (L) than a structure in which the drive source (77) has no overlap with the second power transmission (73) when viewed in the front-rear direction (W).

The engagement member (72) may be engageable with the parking gear (71) above a rotation axis of the parking gear (71).

In this structure, the second power transmission (73) that transmits power to the engagement member (72) is easily located above the parking gear (71). The connection hole (9a) receiving the transmission shaft (74) in the second power transmission (73) may thus easily be located relatively higher. The sealing structure in the connection hole (9a) is thus less likely to be affected by, for example, oil in the case (9) or water outside the case (9) than being in a connection hole (9a) at a lower position, thus easily simplifying the sealing structure.

In the above structure, the first power transmission (6) may include an input member (2) drivably connected to a rotor (12) in the rotary electric machine (1), a pair of output members (3) drivably connected to the respective wheels (WH), and a differential gear assembly (4) that distributes rotation transmitted from the input member (2) to the pair of output members (3). The differential gear assembly (4) may be located in one direction from the parking gear (71) in the front-rear direction (W). The engagement member (72) may be supported in a manner pivotable relative to the case (9) about a pivot axis located in another direction from the parking gear (71) in the front-rear direction (W).

This structure is more likely to include a larger space above the parking gear (71) than a structure in which, for example, an engagement member (72) includes a pivot axis located above the parking gear (71). Thus, the vehicle drive device (100) including the reservoir (8) located above the parking gear (71) is less likely to be upsized, allowing the reservoir (8) to be easily aligned with the second power transmission (73) in the front-rear direction W.

INDUSTRIAL APPLICABILITY

The technique according to the embodiments of the present disclosure is applicable to a vehicle drive device including a rotary electric machine to be a drive power source for wheels, a parking assembly, and a case accommodating the rotary electric machine and the parking assembly.

REFERENCE SIGNS LIST 100 vehicle drive device
X1 rotary electric machine
6 first power transmission
7 parking assembly
71 parking gear
72 engagement member
73 second power transmission
74 transmission shaft
9 case
9a connection hole
WH wheel
L axial direction
V vertical direction
W front-rear direction

The invention claimed is:

1. A vehicle drive device, comprising:
a rotary electric machine configured to be a drive power source for wheels;
a first power transmission configured to transmit power between the rotary electric machine and the wheels;
a parking assembly;
a case accommodating the rotary electric machine, the parking assembly, and at least a part of the first power transmission; and
a reservoir in the case, the reservoir being configured to store oil, wherein:
the parking assembly includes a parking gear connected to a rotary member of the first power transmission and movable with the wheels, an engagement member selectively engageable with the parking gear, and a second power transmission configured to transmit power to the engagement member,
the parking gear is coaxial with the rotary electric machine,
the reservoir and the second power transmission are located above a portion of the first power transmission,
an area of the reservoir in a front-rear direction, an area of the first power transmission in the front-rear direction, and an area of the second power transmission in the front-rear direction overlap an area of the rotary electric machine in the front-rear direction, where the front-rear direction is a direction perpendicular to an axial direction of the rotary electric machine when viewed in a vertical direction, and
the reservoir is above the parking gear and overlaps the second power transmission when viewed in the front-rear direction.

2. The vehicle drive device according to claim 1, wherein the first power transmission includes
an input member drivably connected to a rotor in the rotary electric machine,
a pair of output members drivably connected to the respective wheels, and
a differential gear assembly configured to distribute rotation transmitted from the input member to the pair of output members, and
the differential gear assembly is located opposite to the second power transmission across the reservoir in the front-rear direction.

3. The vehicle drive device according to claim 1, wherein the second power transmission overlaps the rotary electric machine when viewed in the axial direction.

4. The vehicle drive device according to claim 1, wherein the second power transmission is located above the parking gear and overlaps the parking gear when viewed in the vertical direction.

5. The vehicle drive device according to claim 1, wherein the second power transmission includes a transmission shaft extending through a connection hole connecting an outside and an inside of the case and rotatably supported about an axis of the transmission shaft, and
the area of the rotary electric machine in the front-rear direction overlaps an area of the connection hole in the front-rear direction.

6. The vehicle drive device according to claim 1, wherein the second power transmission includes a transmission shaft extending through a connection hole connecting an outside and an inside of the case and rotatably supported about an axis of the transmission shaft, and
a pressing member movable in response to rotation of the transmission shaft to press a press portion included in the engagement member, and
the press portion extends in a direction in which the pressing member moves.

7. The vehicle drive device according to claim 1, wherein the second power transmission includes a transmission shaft extending through a connection hole connecting an outside and an inside of the case and rotatably supported about an axis of the transmission shaft,
the parking assembly further includes a drive source to drive the transmission shaft to rotate, and
the drive source is located outside the case.

8. The vehicle drive device according to claim 7, wherein the drive source overlaps the second power transmission when viewed in the front-rear direction.

9. The vehicle drive device according to claim 1, wherein the engagement member is engageable with the parking gear above a rotation axis of the parking gear.

10. The vehicle drive device according to claim 9, wherein the first power transmission includes
an input member drivably connected to a rotor in the rotary electric machine,
a pair of output members drivably connected to the respective wheels, and
a differential gear assembly configured to distribute rotation transmitted from the input member to the pair of output members,
the differential gear assembly is located in one direction from the parking gear in the front-rear direction, and
the engagement member is supported in a manner pivotable relative to the case about a pivot axis located in another direction from the parking gear in the front-rear direction.

* * * * *